United States Patent
Dostert (10) Patent No.: US 7,061,136 B2
(45) Date of Patent: Jun. 13, 2006

(54) METHOD AND DEVICE FOR CONDITIONING ELECTRIC INSTALLATIONS IN BUILDINGS FOR THE RAPID TRANSMISSION OF DATA

(75) Inventor: Klaus Dostert, Krickenbach (DE)

(73) Assignee: Interessengemeinschaft für Rundfunkschutzrechte GmbH Schutzrechtsverwertung & Co. KG, Düsseldorf (DE)

( * ) Notice: Subject to any disclaimer, the term of this patent is extended or adjusted under 35 U.S.C. 154(b) by 782 days.

(21) Appl. No.: 10/258,070

(22) PCT Filed: Apr. 18, 2001

(86) PCT No.: PCT/EP01/04407

§ 371 (c)(1),
(2), (4) Date: Oct. 18, 2002

(87) PCT Pub. No.: WO01/84737

PCT Pub. Date: Nov. 8, 2001

(65) Prior Publication Data

US 2003/0103307 A1    Jun. 5, 2003

(30) Foreign Application Priority Data

Apr. 19, 2000  (DE) .................................. 100 19 322

(51) Int. Cl.
*H02J 3/02*    (2006.01)
(52) U.S. Cl. ...................... 307/3; 340/310.11; 375/257
(58) Field of Classification Search .................. 307/3; 340/310.11; 375/257
See application file for complete search history.

(56) References Cited

U.S. PATENT DOCUMENTS 5,684,450 A * 11/1997 Brown ........................ 370/493
5,933,073 A *  8/1999 Shuey ........................ 375/258
5,949,327 A    9/1999 Brown

FOREIGN PATENT DOCUMENTS

| DE | 196 54 837 | 6/1998 |
| DE | 195 44 027 | 1/1999 |
| EP | 0 981 188 | 2/2000 |
| WO | WO 99/30434 | 6/1999 |

OTHER PUBLICATIONS

DIN 50065-1, "Signalling on low voltage . . . ", Cenelec, Brussels, 1991.

(Continued)

*Primary Examiner*—Stephen W. Jackson
*Assistant Examiner*—Brett Squires
(74) *Attorney, Agent, or Firm*—Collard & Roe, P.C.

(57) ABSTRACT

A method and a device for conditioning electric installations in buildings for the rapid transmission of data produces symmetrical transmissions paths, along which high frequency signals can be transmitted with substantially no interference, using low-level emission. By introducing an inductance coil into the neutral conductor, as closely as possible to the earth point of the building, the conductor becomes insulated for high frequencies whereas the remaining conductors constitute the high-frequency earth. The high-frequency communication signals are transmitted between the neutral conductor and the protective conductor. This produces transmission channels with relatively good symmetry and negligible interference, which permit a significantly improved exploitation of resources.

19 Claims, 4 Drawing Sheets

OTHER PUBLICATIONS

Dostert, K. (1998) "Power Lines as High Speed Data . . ." *Proceedings*, vol. 2/3 98TH8333,pp. 585-589.
Honary, et al (1999) "Powerline in-house near . . ." *Proceedings*, pp. 9-28.
Dostert, K. (1999) "Powerline Communication und EMV" *Funkschau Seminar*, pp. 1-24.

Zimmerman, et al (2000) "The Low Voltage Power Distribution Network . . ." *International Journal of Electronics and Communications*, vol. 1. pp. 13-22.
Mitteilungen (1999) "Anhörung . . ." *Telekommunikation*, vol. 1.

* cited by examiner

METHOD AND DEVICE FOR CONDITIONING ELECTRIC INSTALLATIONS IN BUILDINGS FOR THE RAPID TRANSMISSION OF DATA

CROSS REFERENCE TO RELATED APPLICATIONS

Applicants claim priority under 35 U.S.C. §119 of GERMAN Application No. 100 19 322.6 filed on 19 Apr. 2000. Applicants also claim priority under 35 U.S.C. §365 of PCT/EP01/04407 filed on 18 Apr. 2001. The international application under PCT article 21(2) was not published in English.

BACKGROUND OF THE INVENTION

1. Field of the Invention

The invention relates to a method and a device for conditioning a building electrical installation for rapid data transmission, for example for realisation of telecommunication services of all kinds, but particularly rapid Internet access by way of sockets and also realisation of digital audio and video signal transmission.

2. Description of the Related Art

There is already known, from WO 99/30434, equipment in which data are transmitted by way of a current supply mains inclusive of a mains internal to a building.

In addition, there is known from DE 195 44 027 C2 a bus system for a building electrical installation system in which three-core or also four-core conventional energy conductors are co-used for the data bus conductor.

Moreover, in DE 196 54 837 A1 there is described a bus system which is used in the field of building automation and in which the coupling into and coupling out of the low-voltage conductors employed is carried out by way of coupling transformers.

The frequency band coming into question for rapid data transmission extends from about 1 MHz to above 30 MHz. Up to now there are use specifications, in the form of European Standard EN 50065, 'Signalling on low voltage electrical installations in the frequency range 3 kHz to 148.5 kHz', CENELEC, Brussels, 1991, only for the frequency range of 9 kHz to 148.5 kHz below the long-wave broadcast band. In the higher frequency ranges of interest there are no freely available bands which could be allocated to new services and protected for that purpose. The spectral overlap with existing services such as broadcasting, maritime or aviation radio and amateur radio is unavoidable, so that without special measures EMV problems are not able to be excluded. This is because energy distribution mains are electromagnetically 'open' structures which, as antennae, receive radio signals radiated in and radiate out supplied high frequency. There are, in addition, numerous disturbances, particularly in buildings, arising through use of electrical energy, so that very low transmission levels are not sufficient for reliable communication. The scope of disturbance in factories can be particularly serious. Aggravation of the HF interference scenario is also expected in the future through the use of very rapid power switches in the form of IGBTs. The capability of realisation of reliable communication on energy distribution mains therefore stands and falls with technically and economically workable solutions for a wide palette of EMV problems. From the presentday viewpoint, current mains could take on a significance as communications medium for a period of up to 20 years. With growing scope of use the EMV problem also expands, so that a constant adaptation and supplementing of EMV solutions will be necessary.

Electromagnetic compatibility is always a two-sided issue. On the one hand it is necessary to design a system so that no impermissible disturbing effect to the environment emanates therefrom and on the other hand the system must function reliably and acceptably in every environment in which no disturbances exceeding limit values are present. The two requirements cannot be considered in isolation, but are characterised by close interaction. If there were to be success in at least partly producing, by relatively simple actions, in existing current mains the usually lacking symmetry, a significant lessening of the EMV problems could be achieved.

In all applications of communication by way of current mains the signal transmission shall fundamentally take place by way of conductor so that no outward radiation of electromagnetic fields occurs. In technical terms this is to be achieved by high symmetry of the conduction and so-called push-pull operation. Symmetry means that outward conductor and return conductor of a communications connection are disposed closely adjacent and that in terms of amount they conduct currents of equal size, wherein the current directions are opposite. In this case the fields compensate for one another in the environment and at small spacing already sink below the detectable limit. That applies particularly well to, for example, coaxial cables and twisted twin-core (English: twisted pair). If, thereagainst, typical building installations are considered, it is then recognised that such ideal conditions of symmetry are not fulfilled there.

On the other hand, however, extensive investigations into high-frequency characteristics of electrical mains installations have given the result that with moderate transmission levels a channel capacity reaching far beyond 100 Mbit/s is available. In this connection reference is made by way of example to the following documentary reference: Dostert, K., 'Power Lines as High Speed Data Transmission Channels—Modelling the Physical Limits', Proceedings of the 5th IEEE International Symposium on Spread Spectrum Techniques and Applications (ISSSTA '98) Sun City, South Africa (Sept. 1998), ISBN 0-7803-4281-X, Vol. 2/3, 585–589.

The construction of connections with several megabit/s thus seems, at first sight, unproblematic. Unfortunately, however, the possibilities of use of the current mains are not unlimited, because, due to the asymmetry, signal emission has to be taken into account, whereby radio services (long-wave, medium-wave and short-wave broadcasting as well as amateur radio bands) can be impaired by entirely free frequency decontrol. Whilst research and development in the past have in the first instance worked on the feasibility of a rapid data transmission on the mains, solutions for problems of electromagnetic compatibility now stand in the foreground. It is necessary on the one hand to work out compromise solutions for frequency allocation and the establishing of level limit values, and on the other hand to prevent an acceptably high signal emission, by suitable measures of symmetrisation and push-pull feed. If, for example, the starting point is that for an acceptable communication a transmission level $U_L$, stated in Volts, is to be fed to a socket, initially the question has to be answered which electrical field strength E (in volts/metre) results therefrom at a specific distance from the supplied conductor. The answer is anything but simple, because E depends, apart from the distance, substantially on the structure of the conductor system, the kind of feed and a number of further environmental conditions. If the ratio $E/U_L$ is formed, then there is obtained a characteristic magnitude with the dimension 1/m which is termed electromagnetic coupling factor or also antenna factor.

Numerical values of $K \sim 10^{-2}/m \ldots 10^{-3}/m$ for the coupling factor result for unconditioned mains from a number of published results, such as those indicated in Proceedings of the 3rd International Symposium on Power-Line Communications and its Applications (ISPLC '99), Lancaster, UK (1999), ISBN: 90-74249-22-1, and in the conference record of the radio exhibition intensive seminar 'Powerline Communication and EMV', Munich, 1 Jul. 1999, and from individual measurements. This means that in the case of a transmission level $U_L=1$ V on the conductor (unmodulated carrier, i.e. bandwidth zero), in the measurement distance (typically 3 m) account has to be taken of electrical field strengths of $E=1 \ldots 10$ mV/m ($=60 \ldots 80$ dBµV/m). These values have particular significance in connection with future establishing of limit values within the scope of the so-termed use determination 30 for the frequency allocation plan Order (Communication 1/1999 of the Reg TP).

A good communication on most installation mains would be possible with a transmission level of 1 V. It is to be noted that here only the narrow-band, unmodulated carrier was taken into consideration and conducted at $60 \ldots 80$ dBµV/m. Substantially lower values are obtained with a wide-band modulation in the case of standardised measurement. Moreover, according to the present invention the coupling factor can be substantially reduced by symmetrising mains actions.

In the investigation of possible interference effects by communication on current mains, distinction must be made between the two mains levels:

Mains level 1: connections between transformer station and building service connection, usually earth cable.

Mains level 2: connections by way of building installation mains.

The mains level 1 represents the so-called 'last mile'. For system and appliance manufacturers the bridging over of the path only as far as the building service connection is not satisfactory. There is expected a significant enhancement of the offered services when even internally of the building no cabling is present any longer and thus, for example, a PC is immediately 'on-line' by insertion in the mains plug. There is no doubt about the feasibility of this vision of Internet from the socket. Nevertheless, it technically does not look like that a universal transmission from the transformer station to the socket will be realised. Rather, the building service connection will represent a transfer point where the mains level 1 ends. The service provider will be responsible for the functioning of this level, whereas the design of level 2 will lie largely in the discretion of the owner of the building or dwelling.

With respect to mains structures, quite significant differences exist, as is known, between the levels 1 and 2. The most important component in the area of mains level 1 is, without doubt, the cable. The most used cable in German distribution mains has a 4-sector cross-sectional geometry, wherein three of the sectors form the phases L1, L2 and L3 of the three-phase current system, whilst the fourth represents the zero conductor or neutral conductor which is earthed at each building service connection. If high-frequency transmission signals are fed symmetrically on two phases into such an energy cable, in which case oppositely disposed sectors are to be preferred, no radio emission is to be feared. Appropriate radio field measurements have confirmed this. However, it is important not to use the neutral conductor, due to its multiple connections to earth.

The energy cable itself thus plays a subordinate role in the unintended emission of electromagnetic energy in communication by way of current mains. Critical points on mains level 1 are, on one side, the busbar system of the transformer station and, on the other side, the building wiring. At these points care has to be taken by suitable measures for a smallest possible antenna effect. The HF-suitable building service connection and the conditioning of the building installation, which is the subject of the present invention, are described in the following.

Figure 1:
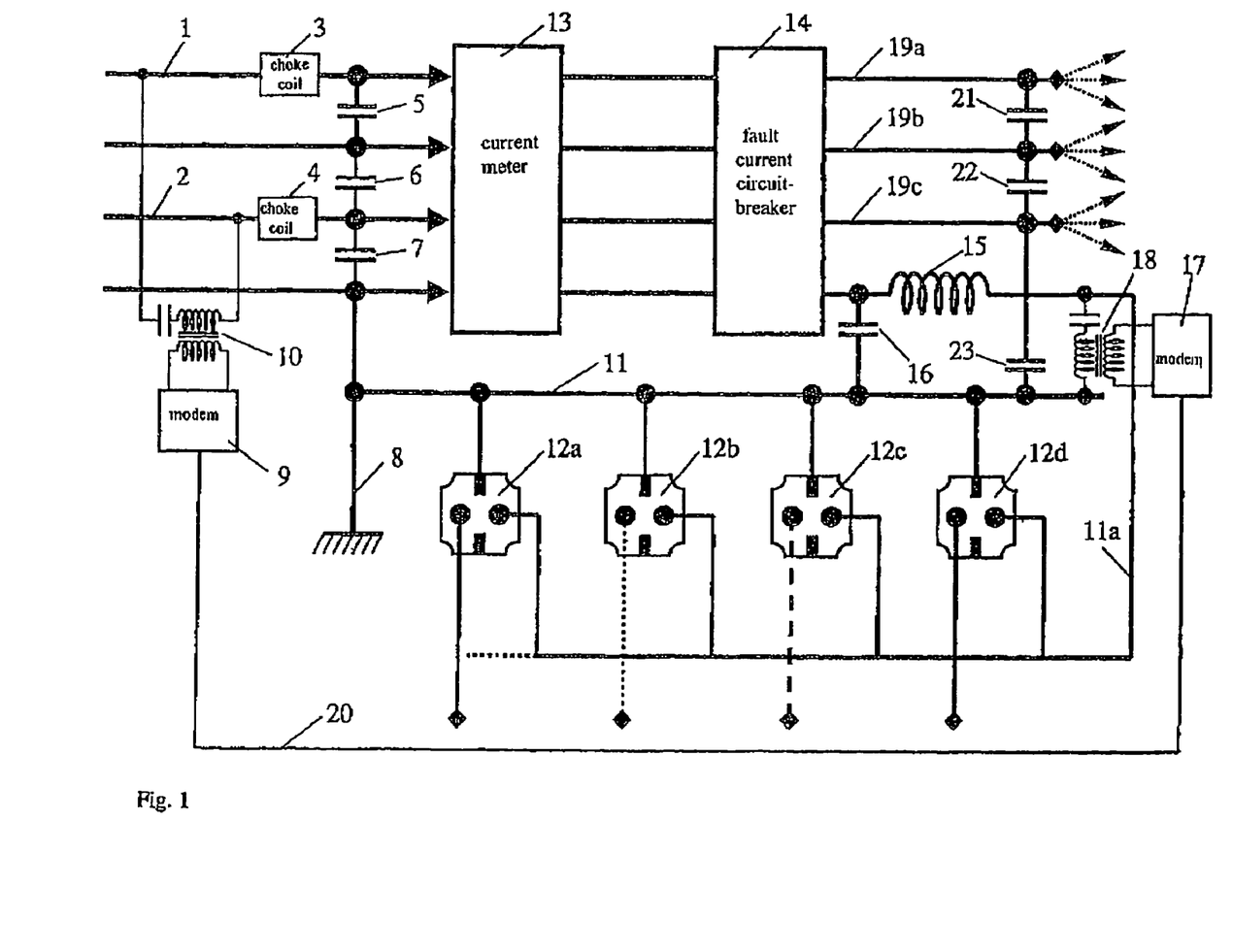

According to FIG. 1, there are to be introduced at the housing service connection into the two high-frequency conducting conductors 1 and 2 the choke coils 3 and 4 which have for high-frequency signals a relatively high resistance in the order of magnitude of approximately 5 times the impedance level of the supply cable. In this case the reflection factor at the coupling-in point is less than 10%. The lowest signal frequency to be transmitted is decisive for corresponding establishing of the inductance of the chokes 3 and 4. Due to the transmission characteristics of the energy cable on mains level 1—see Dostert, K., Zimmermann, M., 'The Low Voltage Power Distribution Network a Last Mile Access Network—Signal Propagation and Noise Scenario in the HF-Range', AEÜ 54 (2000) No. 1, pp. 13–22—the frequency range of approximately 2 MHz ... 10 MHz is here of particular interest for telecommunication applications. In the case of an impedance level the order of magnitude of 50 Ω, a choke impedance of approximately 125 Ω is thus to be achieved at 2 MHz. An inductance of 10 µH results therefrom.

Since the choke coils conduct high currents at the mains frequency (50 Hz), which can amount to up to 40 A in typical building service connections, inductances in this order of magnitude are not simple to realise. Due to the necessary constructional sizes, pure air-core coils come into question only in exceptional cases. It is better to use toroidal core structures of special ferrite materials, wherein the characteristics are decisively determined not only by the material choice, but also by the core construction. Materials are to be selected which have a high saturation induction and in the case of the core construction the inclusion of distributed air gaps is of advantage, because a shear of the magnetic characteristic curves is thereby produced so that the saturation is displaced towards very high currents which lie above typical building service connection values. Good experiences were made in this connection with toroidal cores of 'Kool-Mµ' material of the manufacturer Magnetics. By comparison with an air-core coil, higher impedance values up to a factor of 100 can thus be achieved in the frequency range of interest with a mains current amplitude of 100 A.

In order to obtain a clear and clean separation between mains level 1 and mains level 2, in accordance with FIG. 1 three wide-band high-frequency short-circuits 5, 6 and 7 are inserted relative to the building earth point 8 and are preferably realised in the form of capacitors appropriate for high frequency. Appropriate for high frequency means that even at frequencies of about 30 MHz still no parasitic series inductance, which reduces the short-circuit effect, makes itself noticeable. The selection of suitable capacitors is difficult, because a high voltage strength is required, which can be guaranteed only by a certain constructional size. Most capacitors which are sufficiently voltage-stable are constructed in roll form, whereby the tendency to parasitic inductance is preset. Such components are usually usable only up to frequencies below 5 MHz. For the higher frequencies, so-called chip capacitors are advantageous, which are constructed in waffle form, i.e. they have a block shape, wherein the two capacitor surfaces are alternately coated with the dielectric as intermediate layer. Because a continuously wound conductor structure is not present here, very small parasitic inductances result. Capacitors of this mode of construction with the requisite high voltage strength in the magnitudes, which are necessary here, of about 50 nF, are available only in most recent times. With 50 nF there is obtained at 2 MHz an impedance of approximately 1.5 Ω, so that by virtue of the upstream chokes, which have approximately 125 Ω, virtually a perfect HF block results.

The transmission end stage of a modem 9 for communication on mains level 1 can now be matched to the impedance level of the supply cable with the help of the coupling transformer 10 independently of all electrical occurrences in the building. A thus-designed transfer point ensures that the mains level 1 remains uninfluenced by all events in the customer installation. Only thus can the reliability and availability of offered services ultimately be guaranteed.

It is still to be established why chokes are required only in the two conductors 1 and 2 acted on by high frequency and not in the other two. Due to the close proximity of the four conductors in a cable, electromagnetic couplings are unavoidable, i.e. inevitably a certain amount of crosstalk occurs. This will be strongest immediately in the vicinity of the coupling point, because the transmission level is greatest there.

Here, however, there are disposed the HF short-circuits 5, 6 and 7 which securely prevent the undesired formation of high-frequency voltages at the building service connection point, because the coupling impedances between the conductors in the frequency range of interest are always substantially greater than the impedances of the HF short-circuits.

Whilst a good mains conditioning, which allows an electromagnetically compatible and acceptable, i.e. independent of mains operation, communication at high frequencies, is thus achieved on the mains level 1, a more extensive communication by way of building installation mains is the subject of the following considerations. Within buildings, the electromagnetic compatibility is a particular challenge, because here no possibilities of a mains preparation are known. No approaches to solution are known either for insulation in terms of high frequency or for a symmetrical, pure push-pull signal feed. Thus, up to now a relatively strong coupling effect between the signal voltage $U_L$ on the conductor and the irradiated field strength had to be taken into account, i.e. the coupling factor could quite readily adopt values substantially greater than $10^{-3}/m$.

The principal cause for that is the structure of typical building installation mains. Although the distances to be bridged over on mains level 2 are substantially shorter than on mains level 1 and thereby on the one hand a higher frequency (above 30 MHz) can be used and on the other hand low transmission levels are sufficient, nevertheless problems of electromagnetic compatibility are to be feared because the size of the asymmetry is particularly high. This can be clarified by the following example:

The feedpoint for high-frequency communication signals in buildings is typically the 230 V mains socket, to which, as standard, three conductors lead, namely a phase (L1, L2 or L3), the neutral conductor and the earth conductor. Until now the starting point was a parallel feed between phase and neutral conductor. Whereas in a building one pole of all sockets is necessarily connected with the same conductively through-connected neutral conductor earthed at the housing service connection, the three phases in the ideal case are uniformly distributed at the sockets. A conductive connection of the phases is thus given only in the low-voltage transformer. The connection in terms of high frequency takes place, however, according to FIG. 1 at the housing earth point, but in the form of a short-circuit of all HF signals with simultaneous earthing. This is very unfavourable in the sense of communications use, particularly if it is imagined that a transmitting modem is fed at a socket, for example between L1 and N, and the receiving modem is disposed at a socket with L2. Here only very weak use signals can pass between L1 and L2 by crosstalk if the two phases are led in parallel over a sufficiently long length. In typical building installations that is by no means the case, so that in the case of unfavourable combinations breakdowns have to be taken into account even over relatively small distances between transmitter and receiver. On the other hand a serious asymmetry can be present with respect to the conductor structure, because it is by no means guaranteed that phase and neutral conductor, which lead to a socket, are laid in parallel and closely adjacent over the entire conductor section. In the extreme case they can even come from opposite directions. This leads directly to a high common-mode signal at the feed point, so that even at low transmission power a noticeable emission of electromagnetic waves can be observed.

Whilst the short-circuit effect, which is under consideration, of the phases at the building service connection could in principle be eliminated by insertion of additional choke coils at the housing side, the problems of electromagnetic compatibility would not thereby be solved, because no increase in conduction symmetry is produced.

Thus, with the previously known techniques an exploitation of the resources, which building installation mains offer for rapid communications applications, is possible to only very limited extent.

SUMMARY OF THE INVENTION

A method of conditioning mains for the purpose of rapid and electromagnetically compatible data transmission by way of current supply mains internal to a building is provided to offer remedy to the above disadvantages. In accordance with the method, a) an inductance having a high impedance for the carrier frequencies employed is introduced into the neutral conductor as close as possible to the building earth point, b) inductances are incorporated at the building service connection in two of the three phases L1, L2, L3 coming from the transformer station and the signal coupling-in and decoupling for communication between building and transformer station is carried out on the transformer side of these inductances, c) a short-circuit in terms of high-frequency of all four conductors relative to the building earth point is carried out on the building side at the building service connection, d) if one fault current circuitbreaker is present, the inductance is introduced into the neutral conductor on the load side of the fault current circuitbreaker and a high-frequency short-circuit is produced between earth conductor and the service connection terminal, which is at the building side, of the neutral conductor at the fault current circuitbreaker and e) if several fault current circuitbreakers are present the inductance is inserted on the side, which is remote from the building, of the fault current circuitbreaker as close as possible to the building earth point and the individual fault current circuitbreakers are bridged over in terms of high frequency at the neutral conductor terminals thereof.

In another aspect, a device is provided for transmission of data by way of a current supply mains internal to a building. In accordance with this aspect, a) a choke coil is serially incorporated in the neutral conductor of a building installation mains so that the entire neutral conductor network, at the building side is, for high frequencies, separated from all remaining conductors and from the earth, b) choke coils with relatively high inductance are incorporated at the building service connection in two of the three phases L1, L2, L3 coming from the transformer station and the signal coupling for the communication between building and transformer station is carried out by means of a coupling transformer on the transformer side of these chokes and c) three voltage-stable capacitors are connected between the phases and from one of the phases to the neutral conductor at the building service connection on the building side.

BRIEF DESCRIPTION OF THE DRAWINGS

Here the special embodiment, which is described in the following, of the present invention shall offer a remedy for the disadvantages of previously known techniques. Four drawings are provided for explanation FIG. 1 conditioned building mains with a fault current circuitbreaker (standard), FIG. 2 conditioned building mains with several fault current circuitbreakers, FIG. 3 conditioned building mains with earth conductor and without fault current circuitbreaker and FIG. 4 conditioned building mains without fault current circuitbreaker and without earth conductor (old building).

DETAILED DESCRIPTION OF THE PREFERRED EMBODIMENTS

The building transfer point as a connection to the mains level 1 was already described on the basis of FIG. 1. For the mains level 2 the invention is based on the idea of configuring all three phases and the earth conductor in the case of communication by means of high-frequency signals as "ground" and of supplying the neutral conductor relative to this ground with high frequency. According to the invention this is achieved in that after the current meter 13 and the fault current circuitbreaker 14, a choke 15 is inserted into the neutral conductor so that the energy loss, at the building side, of the neutral conductor forms in terms of high frequency an "island" which is coupled only weakly with the remaining conductors and the earth. The construction of the choke is very simple, since a frequency range above 10 MHz is predominantly of interest for communication internally of a building. The frequency division between mains level 1 and mains level 2 is at the moment still the subject of standardisation considerations, wherein the range 2 . . . 10 MHz is kept in mind for level 1 and the range >10 MHz for level 2. Very good results are already achievable with an inductance of about 5 µH. For avoidance of saturation problems, a suitable coil can be designed to be material-free, i.e. as an air-core coil. An inductance of 5 µH can be achieved with, for example, a cylindrical air-core coil with a diameter of 3.5 cm and a length of about 8 cm. Other constructional shapes, such as, for example, a toroid or a spiral form, can also be used. If communication with frequencies far below 10 MHz is of interest, it can be of advantage to use ferrite materials for increase in the inductance. The toroidal core of 'Kool-Mµ' material that has proved itself at mains level 1 can be advantageously used here.

According to FIG. 1 the feed of the high-frequency signals between earth conductor 11 and neutral conductor 11*a* insulated in terms of high frequency can now be carried out in that a modem 17 is coupled to this conductor by means of a transformer 18. High-frequency currents are prevented from flowing by way of the fault current circuitbreaker with the help of an HF short-circuit 16 in the form of a capacitor. Capacitances in the order of magnitude of 50 . . . 100 nF are sufficient here, wherein good high-frequency characteristics are required. Thereagainst, low demands need to be placed on voltage strength, because only very small differences in potential are present between earth conductor and neutral conductor at this point. The three phases 19*a*, 19*b* and 19*c* do not directly participate in the signal transmission. Due to their ground connection in terms of high frequency they exhibit a screening effect, which is desired in the sense of electromagnetic compatibility.

By virtue of the described conditioning in the direction of mains level 1 there is given at the building service connection point an earthing in terms of high frequency of all arriving conductors. The earth conductor 11 is internal to the building and connected with the corresponding contacts of all earth contact sockets of the building goes out from this earth point. The appropriate standards prescribe the use of such sockets as compulsory. Four sockets 12*a* to 12*d* with the corresponding earth conductor connection are illustrated by way of example in FIG. 1. The further common conductor leading to all sockets is the neutral conductor. The phases, thereagainst, are,—as already explained—usually distributed at the sockets in accordance with standpoints in terms of energy technology. For the most part no records exist with respect to the distribution. The coupling of a modem for communication by way of the building current mains is therefore carried out at a socket always on the earth conductor and neutral conductor in analogous manner as was described for the components 17 and 18.

The use in accordance with the invention of the neutral conductor for conducting high-frequency signals hitherto brought no achieved advantages, not only with respect to transmission quality, but also the electromagnetic compatibility; in detail these are:

Earth conductor and neutral conductor are, in the normal case, at almost the same electrical potential. This means that neither a mains alternating voltage nor interfering signals are encountered between the conductors. Thus on the one hand the demands on voltage strength of the capacitor in the coupler 18 are low and on the other hand it is possible to even completely dispense with a separation of potential between modem and mains. In the latter case the modem ground corresponds with the earth conductor potential and the signal coupling takes place directly by way of a capacitor on the neutral conductor. In practice, the use of a transformer can nevertheless be sensible, for example for matching the transmission end stage impedance to the conductor impedance level.

Due to the fact that neutral conductor and earth conductor at the building service connection are conductively connected, the major part of the disturbances arising through operation of the mains is short-circuited, so that only a very small disturbance level is encountered between these conductors. Moreover, the two conductors run—as indicated in FIG. 1—virtually always in parallel towards each socket. There is accordingly present in the entire building a twin-wire mains which is relatively well symmetrised by comparison with the rest of the current mains and which on the one hand has a good transmission characteristic and on the other hand has only a slight tendency to signal irradiation, because supplied high-frequency signals can propagate from the feed point over relatively long lengths in push-pull action. The undesired push-pull/push-push conversion thus takes place only with already strongly attenuated transmission signals. It is accordingly possible with the use, in accordance with the invention, of building installation mains for rapid data transmission to start from significantly lower electromagnetic coupling factors than was determined, for example, in the scope of the study Powerline (study results for EMV problems) in the instruction of Reg TP; http://www.regtp.de/tech_reg_tele/start/fs_06.html.

To assist the earthing, in terms of high frequency, of the three phases it can be advantageous, particularly in the case of extensive installation mains in large buildings, to incorporate additional capacitors 21, 22 and 23 in, for example, subdivisions.

For realisation of universal communication of transformer station with socket there is still required a connection 20 of the two modems 19 and 17 at the building service connection in FIG. 1. Such a 'gateway' can be realised in simple manner by, for example, a twin-core conductor or a four-core conductor for separation of the transmission directions. Moreover, the use of coaxial conductors or glass fibres is also possible.

It is important to make clear that electrical safety is not prejudiced by any of the measures according to the invention. In particular, the function of fault current circuitbreakers is not hindered or restricted in any way. This is possible in technically simple manner because the carrier frequencies into question for rapid data transmission lie very far above the mains frequency so that a perfect separation in terms of frequency of the function is already assisted intrinsically.

Figure 2:
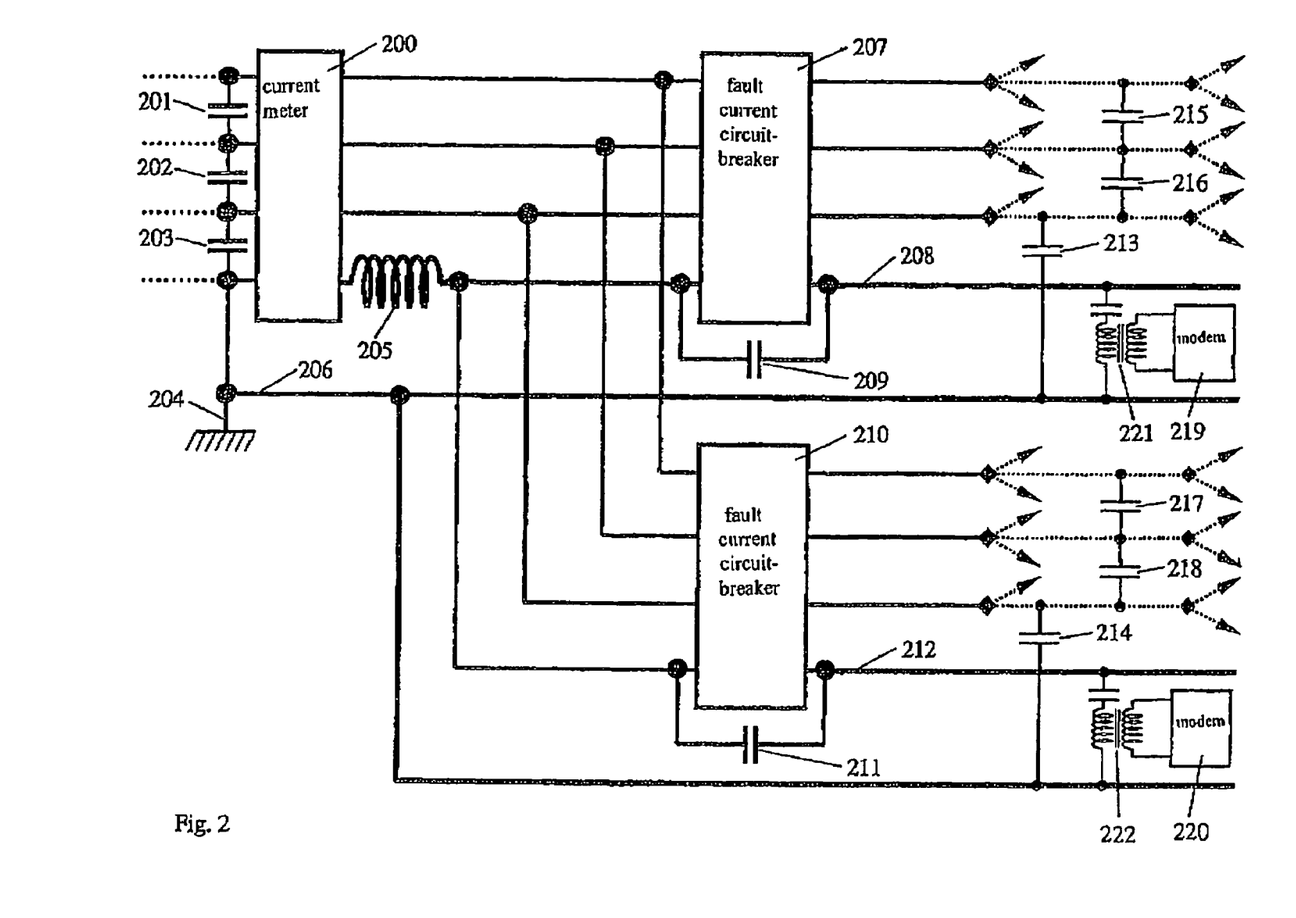
Figure 3:
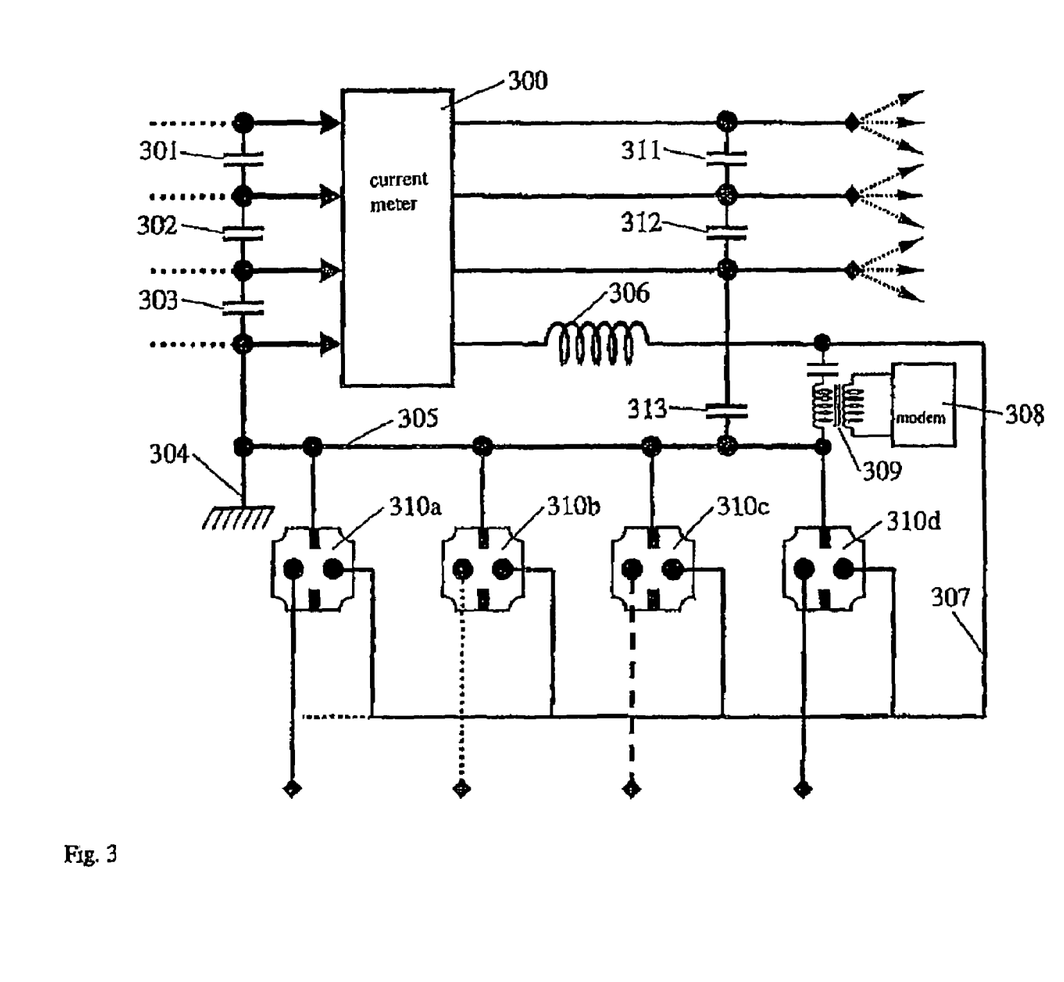
Figure 4:
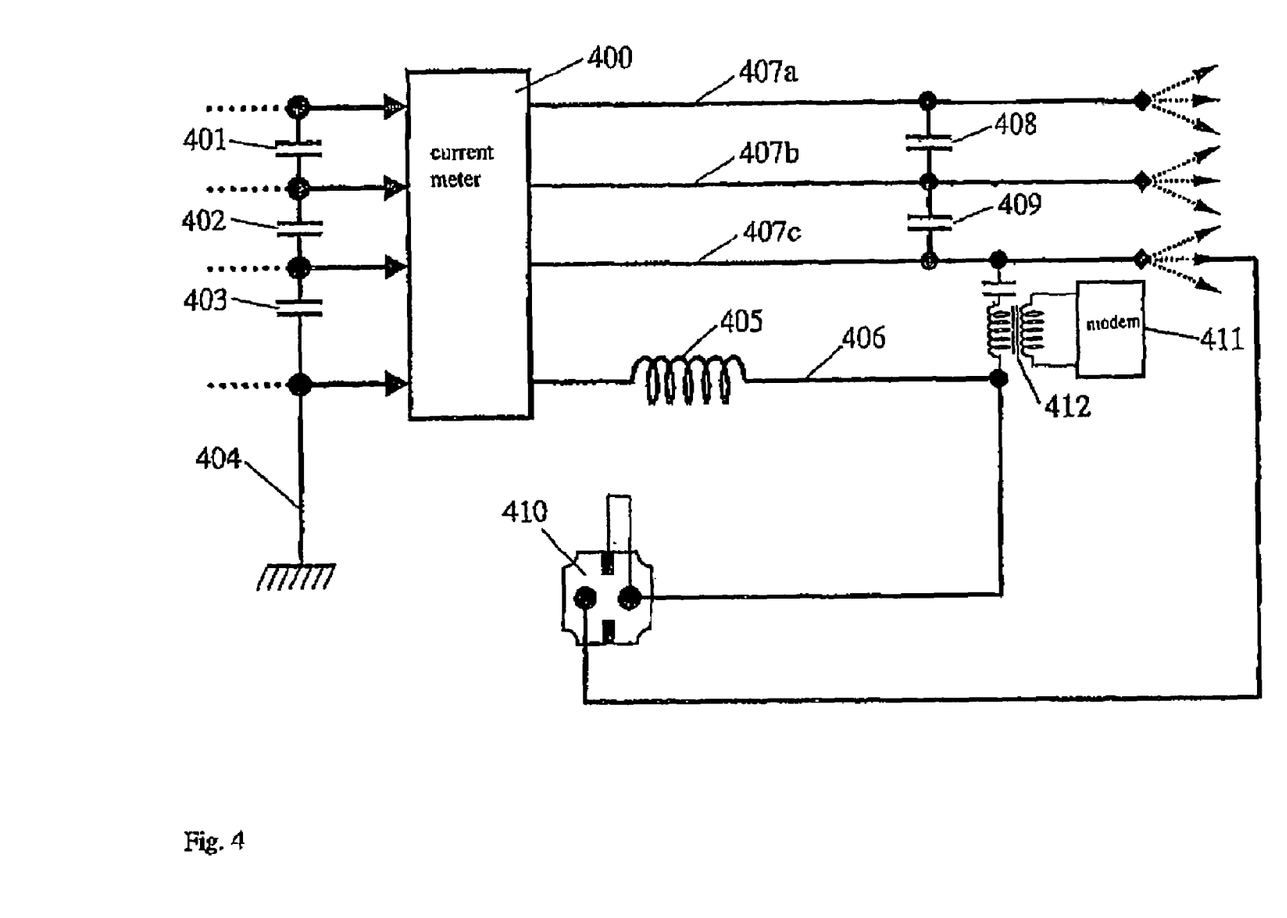

The further drawings FIG. 2 to FIG. 4 show special refinements of the invention for building installations which differ from the standard taken as a basis in FIG. 1.

FIG. 2 relates to a building installation which is equipped with two fault current circuitbreakers. The principle illustrated here can be extended in simple manner to any desired number of fault current circuitbreakers. The building surface connection relative to the supply transformer side does not differ from FIG. 1. The three short-circuits 201, 202 and 203 relative to the earth point 204 are similarly present here. There follows the current meter 200, at the outlet of which at the housing side the choke coil 205 is inserted into the neutral conductor, whereby the desired insulation in terms of high frequency of this conductor over the entire building mains results. Now follow the two fault current circuitbreakers 207 and 210, at which the neutral conductor connections for the high-frequency signals are now connected at the input side and output side by way of the capacitors 209 and 211. The capacitors have a very high impedance for the mains alternating voltage and remain without effect. High-frequency communication signals, thereagainst, are conducted by them past the fault current circuitbreakers. Thereby on the one hand no HF currents flow through the circuitbreakers and on the other hand there is obtained a good HF coupling of the respective neutral conductor mains parts 208 and 212 after the fault current circuitbreakers, so that the communication between the mains parts is possible without problems. The signal coupling of modems 219, 220 is again carried out in the above-described, advantageous manner between earth conductor 206 and neutral conductors 208, 212. The modem connection at sockets takes place analogously to FIG. 1.

FIG. 3 relates to a building installation without fault current circuitbreakers, but equipped with an earth conductor. The building service connection relative to the supply transformer side here, too, does not differ from FIG. 1. The three short-circuits 301, 302 and 303 relative to the earth point 304 are again present. There follows the current meter 300, at the output of which at the housing side the choke coil 306 is inserted into the neutral conductor 307, whereby the desired insulation in terms of high frequency of this conductor results over the entire building mains. The signal coupling of a modem 308 is again carried out in the already described advantageous manner between the earth conductor 305 and the neutral conductor 307. The modem connection to the sockets 310*a* to 310*d* illustrated by way of example is carried out analogously to FIG. 1. To assist the earthing in terms of high frequency of the three phases it can also be advantageous here, particularly in large buildings, to incorporate additional capacitors 311, 312 and 313 in, for example, subdivisions.

FIG. 4 relates to out-of-date building installations equipped with neither a fault current circuitbreaker nor an earth conductor. The existence of such old installations may be very small in Germany, with a tendency to decrease. Nevertheless, the present invention can also be advantageously used in such survivors for rapid communication by way of the building current mains.

The building service connection relative to the supply transformer side here, too, does not differ from FIG. 1. The three short-circuits 401, 402 and 403 relative to the earth point 404 are again present. There follows the current meter 400, at the output of which at the housing side the choke coil 405 is inserted into the neutral conductor 406, whereby the desired insulation in terms of high frequency of this conductor results over the entire building mains. The signal coupling of a modem 411 is now carried out between the earthed, in terms of high frequency, three-phase system 407*a*, 407*b* and 407*c* and the neutral conductor 406 by means of the transformer 412. The coupling between the two poles takes place at a socket 410.

To assist the earthing in terms of high frequency of the three phases it can also be of advantage here, particularly in large buildings, to incorporate additional capacitors 408 and 409 in subdivisions.

Due to the lack of an earth conductor, some disadvantages are present in the structures according to FIG. 4:

For the signal coupling, the mains alternating voltage, which amounts to about 230 V between the signal-conducting conductors, has to be isolated. The coupling capacitor in the transformer 412 accordingly has to be sufficiently voltage stable and the transformer must effect a secure separation, in terms of conductivity, between modem and mains.

The symmetry of the conductor systems conducting the high frequency can be less in structures according to FIG. 4 than in the case of the shared-use earth conductor according to FIGS. 1 to 3. A higher push-pull/push-push conversion, which leads to increased signal irradiation, can result therefrom.

In addition, the 'earthing' of sockets, i.e. a connection of neutral conductor relative to the earth contact in the socket, can prove disadvantageous with respect to electromagnetic compatibility, because high-frequency signals can thereby pass into appliances connected to the building and thus an additional antenna effect occurs.

In general, however, the solution according to the invention always allows expectation of better results with respect not only to transmission quality, but also to electromagnetic compatibility than the previous simple signal coupling between neutral conductor and phase of a socket. Essentially, the advantages of the solution according to the invention here result from the fact that the entire three-phase system in the building mains is earthed in terms of high frequency and the neutral conductor can, on its own, conduct high frequency relative to this 'ground'.

In a further embodiment of the invention a choke coil is inserted directly at the building earth point into the earth conductor instead of the neutral conductor in order to isolate these over the entire building in terms of high frequency from the remaining conductors representing the 'ground'. Since the earth conductor in normal operation is without current, highly permeable ferrite material can be used for the choke so that a high impedance and thus good HF insulation are achieved with a small constructional size. The signal coupling here, too, is carried out between neutral conductor and earth conductor with all advantages resulting therefrom. With respect to electromagnetic compatibility, however, loading of the earth conductor with high frequency can prove disadvantageous, because high-frequency signals can thereby pass to appliances connected with the housing and thus an additional antenna effect arises. Since the insulation in terms of high frequency, however, can now be carried out substantially perfectly through the choke due to the lack of premagnetisation current, it can be assumed that in this configuration it is possible to manage with a lower transmission power and thus compensation can be provided, by appropriate reduction in level, for the increased emission.

The invention of claimed is:

1. Method of conditioning mains for the purpose of rapid and electromagnetically compatible data transmission by way of current supply mains internal to a building, characterised in that
   a) an inductance having a high impedance for the carrier frequencies employed is introduced into the neutral conductor as close as possible to the building earth point,
   b) inductances are incorporated at the building service connection in two of the three phases L1, L2, L3 coming from a transformer station and the signal coupling-in and decoupling for communication between building and transformer station is carried out on the transformer side of these inductances,
   c) a short-circuit in terms of high-frequency of all four conductors relative to the building earth point is carried out on the building side at the building service connection,
   d) if one fault current circuitbreaker is present, the inductance is introduced into the neutral conductor on the load side of the fault current circuitbreaker and a high-frequency short-circuit is produced between earth conductor and the service connection terminal, which is at the building side, of the neutral conductor at the fault current circuitbreaker and
   e) if several fault current circuitbreakers are present the inductance is inserted on the side, which is remote from the building, of the fault current circuitbreaker as close as possible to the building earth point and the individual fault current circuitbreakers are bridged over in terms of high frequency at the neutral conductor terminals thereof.

2. Method according to claim 1, characterised in that the signal coupling-in and decoupling for the rapid data transmission internally of a building is carried out at each service connection point in the building between neutral conductor and earth conductor.

3. Method according to claim 1, characterised in that the signal coupling-in and decoupling for the rapid data transmission internally of a building is carried out at each service connection point in the building between neutral conductor and one of the three phases L1, L2 and L3, wherein all three phases are earthed in terms of high frequency and wherein to assist this earthing function, apart from the high-frequency short-circuit according to 1c) additional high-frequency short-circuits between the phases and the earth conductor are if needed inserted at several places in the building.

4. Method according to claim 1, characterised in that in the case of a special mains configuration an inductance is introduced serially into the earth conductor so that this is insulated in terms of high frequency over the entire building from the remaining conductors and earth and that then the HF signal feed takes place between either earth conductor and neutral conductor or earth conductor and one of the three phases wherein the neutral conductor and/or the three phases represent ground in terms of high frequency.

5. Device for transmission of data by way of a current supply mains internal to a building/characterised in that
   a choke coil (15) is serially incorporated in the neutral conductor of a building installation mains so that the entire neutral conductor network, at the building side is, for high frequencies, separated from all remaining conductors and from the earth
   b) choke coils (3, 4) with relatively high inductance are incorporated at the building service connection in two of the three phases L1, L2, L3 coming from a transformer station and the signal coupling for the communication between building and transformer station is carried out by means of a coupling transformer (10) on the transformer side of these chokes and
   c) three voltage-stable capacitors (5, 6, 7) are connected between the phases and from one of the phases to the neutral conductor at the building service connection on the building side.

6. Device according to claim 5, characterised in that in the presence of a 4-sector cable used for the building service connection the selection of the two phases used for the data transmission is carried out in such a manner that these phases are diagonally opposite one another in the cable.

7. Device according to claim 5, characterised in that in the presence of one fault current circuitbreaker (14) the choke coil (15) is introduced into neutral conductor on the load side of the fault current circuitbreaker and a capacitor (16), keeping high-frequency signals away from the fault current circuitbreaker is provided between the circuitbreaker and the service connection terminal, which is at the building side, of the neutral conductor at the fault current circuitbreaker.

8. Device according to claim 5, characterised in that in the presence of several fault current circuitbreakers (207, 210) the choke coil (205) is inserted on the feed side of the fault current circuitbreaker.

9. Device according to claim 8, characterised in that the choke coil is inserted in the vicinity of the building earth point (204).

10. Device according to claim 8, characterised in that the fault current circuitbreakers (207, 210) are bridged over at the neutral conductor terminals thereof by capacitors (209, 210) so that high-frequency signals are taken past the fault current circuitbreakers.

11. Device according to claim 5, characterised in that the signal coupling for rapid communication is carried out at each service connection point in the building between neutral conductor (11a) and earth conductor (11), wherein the earth conductor represents ground in terms of high frequency and the neutral conductor conducts the high-frequency signals.

12. Device according to claim 5, characterised in that the signal coupling-in and decoupling for the rapid communication internally of a building is carried out at each service connection point in the building between neutral conductor and one of the three phases L1, L2 and L3, wherein apart from the earth conductor the three phases also represent ground in terms of high frequency.

13. Device according to claim 12, characterised in that to assist of this ground function, high-frequency short-circuits (21, 22, 23) are inserted at several places in the building between the phases and the earth conductor.

14. Device according to claim 5, characterised in that a choke coil with high inductance is serially introduced into the earth conductor so that this is insulated in terms of high frequency over the entire building from the remaining conductors and earth and that the HF signal transmission takes place between either earth conductor and neutral conductor or earth conductor and one of the three phases, wherein the neutral conductor and/or the three phases represent ground in terms of high frequency.

15. Device according to claim 5, characterised in that in installation pains without earth conductor a choke coil (405) with sufficiently high inductance is introduced serially into the neutral conductor on the building side of the current meter so that this conductor is insulated in terms of high frequency over the entire building from the remaining conductors and earth and that the HF signal transmission takes place between neutral conductor and the three phases representing ground in terms of high frequency.

16. Device according to claim 5, characterised in that the choke coil (15) is realised in such a manner that it is clipped onto the top-hat rail system of a meter cabinet or distributor cabinet and is introduced directly into the corresponding conductor section.

17. Device according to claim 5, characterised in that the choke coil (15) serially incorporated in the neutral conductor is constructed as an air-core coil.

18. Device according to claim 5, characterised in that the choke coils (34) incorporated in two of the three phases coming from the transformer station have a core of ferrite material.

19. Device according to claim 5, characterised in that the three voltage-stable capacitors (5, 6, 7) provided at the building service connection on the building side are placed near the housing earth point.

* * * * *

UNITED STATES PATENT AND TRADEMARK OFFICE
CERTIFICATE OF CORRECTION

| | | |
|---|---|---|
| PATENT NO. | : 7,061,136 B2 | Page 1 of 1 |
| APPLICATION NO. | : 10/258070 | |
| DATED | : June 13, 2006 | |
| INVENTOR(S) | : Dostert | |

It is certified that error appears in the above-identified patent and that said Letters Patent is hereby corrected as shown below:

Column 12, line 25, (Line 2 of Claim 5), after the word "building" please change "/" to correctly read:   --,--.

Signed and Sealed this

Third Day of July, 2007

JON W. DUDAS
*Director of the United States Patent and Trademark Office*